(12) United States Patent
Falk et al.

(10) Patent No.: US 9,147,088 B2
(45) Date of Patent: Sep. 29, 2015

(54) METHOD FOR MONITORING A TAMPER PROTECTION AND MONITORING SYSTEM FOR A FIELD DEVICE HAVING TAMPER PROTECTION

(75) Inventors: Rainer Falk, Poing (DE); Steffen Fries, Baldham (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 14/112,534

(22) PCT Filed: Apr. 11, 2012

(86) PCT No.: PCT/EP2012/056517
§ 371 (c)(1),
(2), (4) Date: Oct. 17, 2013

(87) PCT Pub. No.: WO2012/143271
PCT Pub. Date: Oct. 26, 2012

(65) Prior Publication Data
US 2014/0047568 A1 Feb. 13, 2014

(30) Foreign Application Priority Data
Apr. 18, 2011 (DE) .......... 10 2011 007 572

(51) Int. Cl.
*G06F 21/86* (2013.01)
*G05B 19/042* (2006.01)

(52) U.S. Cl.
CPC ............ *G06F 21/86* (2013.01); *G05B 19/0425* (2013.01); *G05B 2219/37038* (2013.01)

(58) Field of Classification Search
CPC ......... G06F 21/86; G06F 21/88; G06F 21/70; G06F 21/87; G06F 21/73
USPC ...................... 713/190–194; 726/34
See application file for complete search history.

(56) References Cited

U.S. PATENT DOCUMENTS

| | | | |
|---|---|---|---|
| 6,357,007 B1 | 3/2002 | Cromer et al. | |
| 7,520,002 B2* | 4/2009 | Naether | 726/34 |

(Continued)

FOREIGN PATENT DOCUMENTS

| | | |
|---|---|---|
| DE | 10339349 | 3/2005 |
| DE | 102004017529 | 11/2005 |
| WO | 2004078787 | 9/2004 |

OTHER PUBLICATIONS

German Office Action dated Jan. 11, 2013 for corresponding German Patent Application No. DE 10 2011 007 572.0 with English translation.

(Continued)

*Primary Examiner* — Fikremariam A Yalew
(74) *Attorney, Agent, or Firm* — Lempia Summerfield Katz LLC

(57) ABSTRACT

The embodiments relate to tamper protection of a field device. The method includes: checking whether manipulation of the field device has taken place; outputting a non-manipulation certificate in case a negative inspection result is determined; transferring the non-manipulation certificate; a registration device checking the non-manipulation certificate; determining an active status of the field device in case the non-manipulation certificate is valid; checking the field device by querying the status of the field device; transferring field device data to the monitoring device; and accepting the field device data if the field device has an active status. The invention further relates to a monitoring system for a field device and a use.

18 Claims, 3 Drawing Sheets

(56) References Cited

U.S. PATENT DOCUMENTS

| | | | |
|---|---|---|---|
| 7,526,648 B2* | 4/2009 | Arditti et al. | 713/175 |
| 8,188,860 B2* | 5/2012 | Haid | 340/540 |
| 8,683,233 B2* | 3/2014 | Feilen et al. | 713/194 |
| 2007/0176734 A1 | 8/2007 | Da Silva Neto | |
| 2007/0255966 A1* | 11/2007 | Condorelli et al. | 713/194 |
| 2009/0106563 A1* | 4/2009 | Cherpantier | 713/194 |
| 2009/0204695 A1 | 8/2009 | Busgen et al. | |
| 2014/0298044 A1* | 10/2014 | Walker et al. | 713/194 |

OTHER PUBLICATIONS

International Search Report and Written Opinion of the International Searching Authority dated Jul. 31, 2012 for corresponding PCT/EP2012/056517 with English translation.

Pim Tuyls et al., "Strong Authentication with Physical Unclonable Functions", Security, Privacy, and Trust in Modem Data Management: with 13 Tables, 2007, pp. 133-148.

"Trusted Platform Module," Wikipedia, webpage, http://en.wikipedia.org/wiki/Trusted_platform_Module, pp. 1-4, 2011.

* cited by examiner

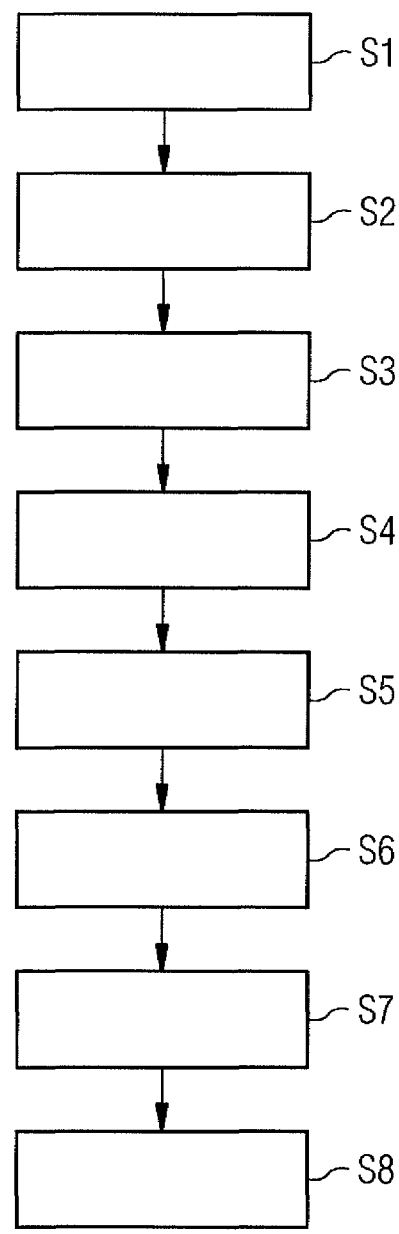

METHOD FOR MONITORING A TAMPER PROTECTION AND MONITORING SYSTEM FOR A FIELD DEVICE HAVING TAMPER PROTECTION

The present patent document is a §371 nationalization of PCT Application Serial Number PCT/EP2012/056517, filed Apr. 11, 2012, designating the United States, which is hereby incorporated by reference, and this patent document also claims the benefit of DE 10 2011 007 572.0, filed Apr. 18, 2011, which is also hereby incorporated by reference.

FIELD

The present embodiments relate to tamper protection, a monitoring system for a field device having tamper protection, and a method for using a monitoring system.

BACKGROUND

Field devices, for example traffic signal installations for traffic control, signal installations for trains, and switches, are usually connected to a control station or a signal box for the operating and monitoring thereof. In this context, the communication between field device and control station may take place both by wired connections (run cables) or also wirelessly by a radio link.

In order to be able to detect a physical manipulation at a field device by a possible attacker, sensors, for example motion sensors, may be used. In order to impede a manipulation of electronic circuits in the field device itself, hardware security-integrated circuits may be used that store cryptographic keys and perform cryptographic operations. Such integrated circuits usually have a tamper protection, for example in the form of sensors arranged directly on the integrated circuit. The sensors are designed for detecting an unauthorized opening of the integrated circuit.

Such a hardware security-integrated circuit may be a "trusted platform module," the data for which can be found at http://en.wikipedia.org/wiki/Trusted_Platform_Module. For example, such integrated circuits are installed in PCs or notebooks.

The field of burglar alarm installations and alarm installations for buildings use contacts at doors and windows, and/or motion sensors for signaling a break-in or unauthorized opening or penetration into the building or into a room. In the case of a break-in into a building, for example, an alarm is triggered by a siren, or something similar, and it is also possible to contact a police operations center at the same time. To protect the alarm installation against manipulations, the sensors themselves may be equipped with so-called tamper sensors that detect a manipulation of the burglar alarm installation or of the alarm installation, especially when the housing is opened and/or a sensor is dismantled. The tamper sensors then transfer the information to the alarm installation that, in turn, triggers an alarm.

One way to protect parts of a circuit board or an entire circuit board against manipulation is to screw metal plates onto the circuit board in such a manner that a capacitor is formed overall. The capacitance of this capacitor is then continuously monitored so that in the case of a deviation of the normal capacitance value, for example by touching the metal plate or its removal, a change in the capacitance occurs. If a change in the capacitance is found, an alarm may be triggered and a memory on the board that, for example, contains sensitive data, may be deleted so that an attacker cannot obtain access to the sensitive data.

SUMMARY AND DESCRIPTION

The scope of the present invention is defined solely by the appended claims and is not affected to any degree by the statements within this summary.

A method for monitoring a tamper protection of a field device is provided, and a monitoring system for a field device having tamper protection in which tamper protection is provided for in a simple and cost-effective manner is provided. At the same time, the method and monitoring system should be flexibly upgradable and adaptable in a simple and cost-effective manner for a multiplicity of different devices and provide a desired security level against physical manipulation.

In another embodiment, a method for monitoring a tamper protection of a field device, includes checking whether a manipulation has taken place at the field device, outputting a non-manipulation certificate if a negative test result has been determined, transmitting the non-manipulation certificate, checking the non-manipulation certificate by a registration device, determining an active status of the field device by the registration device if the non-manipulation certificate is valid, checking the field device by a monitoring device by inquiring about the status of the field device, transferring the field device data to the monitoring device, and accepting the field device data by the monitoring device if the field device has an active status.

In another embodiment, a monitoring system for a field device having tamper protection includes a tamper monitoring device configurable to monitor the field device for tamper protection, a registration device configurable to register and monitor the status of the field device, a monitoring device configurable to control and monitor the field device, wherein the tamper monitoring device is configurable to check whether a manipulation has occurred at the field device and outputs a non-manipulation certificate if a negative test result has been determined, and wherein the registration device is configurable to check the non-manipulation certificate and determine an active status of the field device in the case of a valid non-manipulation certificate, and wherein the monitoring device is configurable to check a status of the field device, and wherein the monitoring device is configurable to accept field device data if the field device has an active status.

In one embodiment, a tamper protection may be upgraded in a simple manner and without relatively great expenditure especially in the case of field devices already being present. A further advantage is that the field device to be monitored may be developed and produced without having to take into consideration specially designed tamper protection measures in the field device itself. The method for monitoring the tamper protection only blocks the field device and/or a security key deposited in the field device so that any data possibly read out of a memory of the field device, especially the security key which may have been read out by an attacker, will not be of any use to the latter. A further advantage is that such monitoring of a tamper protection may be used for many different types of field devices which lowers the production costs for respective field devices considerably. The tamper protection only needs to be developed once and not separately for each field device type. In addition, no direct communication is needed between the tamper protection monitoring device and the field device, saving production costs.

The non-manipulation certificate is transferred to the registration device by the field device. In this manner, no additional interfaces are needed for transmitting the non-manipulation certificate. Pre-existing communication channels or lines of the field device may be used. Overall, the production effort for a tamper monitoring device for the field device is thus lowered.

Advantageously, the transmitting of the non-manipulation certificate occurs essentially at the same time as a transmitting of the field device data, wherein the non-manipulation certificate and the field device data are transmitted to a common control device including the registration device and the monitoring device. It is thus possible to check in a particularly rapid and reliable manner whether a physical manipulation of the field device has taken place.

The transmitting of the non-manipulation certificate is suitably carried out by the Internet, or by at least one mobile radio network, or by at least one satellite network, or some combination thereof. As reliably as possible, a transmission is guaranteed in a simple manner, especially when a number of transmission types are used in parallel. At the same time, conventional transmission paths may be used. The conventional transmission paths are inexpensive since the devices needed for the transmission are available in large numbers.

In one embodiment checking whether a manipulation has occurred at the field device, outputting of a non-manipulation certificate if a negative test result has been determined, and transmitting of the non-manipulation certificate are carried out at regular time intervals. The status of the corresponding field device is determined reliably as being inactive in the case of a lack of the transmission of the non-manipulation certificate.

A control device including the registration device and the monitoring device may be arranged in the monitoring system. As a result, no additional external interfaces need to be arranged, or cables need to be laid in order to check the non-manipulation certificate. At the same time, the field device data and the non-manipulation certificate may be transmitted between the field device and the monitoring device on the communication channels already existing, simplifying the operation, control and monitoring of the field device.

The control device is suitably designed in the form of a SCADA control board or an enterprise resource planning (ERP) system. A control device is provided in a simple and reliable manner. In addition, such a control device is designed not only for monitoring the tamper protection of a field device but may also handle additional tasks such as, for example a visual display, or regulation of other systems or devices.

In one embodiment, at least one of the devices includes a communication interface to the Internet, to a mobile radio network, and/or to a satellite network. In this embodiment, as reliable as possible a transmission is guaranteed especially if a number of transmission networks are used in parallel. At the same time, the existing transmission paths may be used. The existing transmission paths are cost-effective since the devices needed for the transmission are easily available.

In another embodiment, the tamper monitoring device has an autonomous power supply. In this manner, the physical manipulation of the tamper monitoring device itself is reduced. At the same time, the fault tolerance of the tamper monitoring device is increased since no external power supply is necessary and thus the tamper monitoring device still monitors the field device in the case of a power failure.

BRIEF DESCRIPTION OF THE DRAWINGS

FIG. 5 depicts a method for monitoring a tamper protection of a field device according to an embodiment.

DETAILED DESCRIPTION

Figure 1:
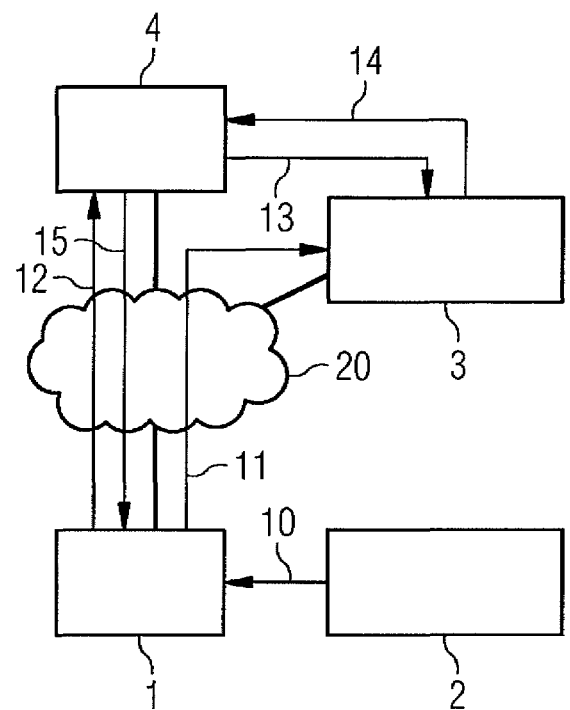
FIG. 1 depicts a monitoring system for a field device having tamper protection according to a first embodiment.

FIG. 1 depicts one embodiment of a monitoring system for a field device having tamper protection. In FIG. 1, reference symbol 1 designates a field device. The field device 1 is connected to a tamper monitoring device 2. The tamper monitoring device 2 is configured to monitor the field device 1 with respect to whether the field device 1 is manipulated physically. The field device 1 is also connected to a registration device 3 for registering and status monitoring of the field device 1. The registration device 3, in turn, exchanges data with a monitoring device 4 for controlling and monitoring the field device 1. The monitoring device 4 is connected to the field device 1 via the Internet 20 according to FIG. 1.

If the tamper monitoring device 2 has not detected any physical manipulation or a tamper event, the tamper monitoring device 2 issues a non-manipulation certificate or a non-tampering assertion "NTA" and transmits the non-manipulation certificate or NTA (reference symbol 10) to the field device 1 protected by the tamper monitoring device 2. The non-tampering assertion is then transmitted, for example, to a registration device 3, which may be designed in the form of a device registry server (reference symbol 11). The device registry server 11 blocks the field device's 1, security feature or the field device's security credentials (e.g. certificates, keys, passwords or field device accounts) if no non-tampering assertion issued to the tamper monitoring device 2 is present at the device registry server 3 during a particular time interval or is transmitted to the device registry server 3. The status of the field device 1 is then specified as inactive.

If a valid non-tampering assertion is present, the status of the field device 1 is deposited as active in the registration device 3. In the meantime and/or also thereafter, the field device 1 transmits (reference symbol 12) field device data, for example control data or feedback data of the field device 1 to the monitoring device 4. The monitoring device 4 may be constructed, for example, as a control computer, as a stored-programmable controller, as a SCADA control board, or as a ERP system. The monitoring device 4 then tests in a further act (reference symbol 13) whether the status of the field device 1 is active. For this purpose, the monitoring device 4 inquires about the status of the field device 1 at the registration device 3. The registration device 3 transmits (reference symbol 14) the status to the monitoring device 4. If the status of the field device 1 is valid, the monitoring device 4 accepts the field device data transmitted to the monitoring device 4 from the field device 1 and may transmit control data for the field device 1 (reference symbol 15).

Should a physical manipulation be performed at the field device 1, for example by an attacker, the manipulation is detected by the tamper monitoring device 2. The tamper monitoring device 2 thereupon issues no further non-tampering assertions and no more non-tampering assertions will thus be transmitted to the field device 1, either. If then the registration device 3 receives no further non-tampering assertions from the field device 1, the status of the field device 1 is deposited as inactive by the registration device 3 after a certain predeterminable time interval. Even if an attacker should thus succeed in reading out keys for encryption from the field device 1 itself by a physical manipulation, the attacker cannot use the keys for accessing the monitoring device 4 since the monitoring device 4 firstly detects or has detected the status of the field device 1 as inactive by interrogation at the registration device 3 and thus no longer accepts any field device data from the field device 1, and also transmits no further control data to the field device 1.

Figure 2:
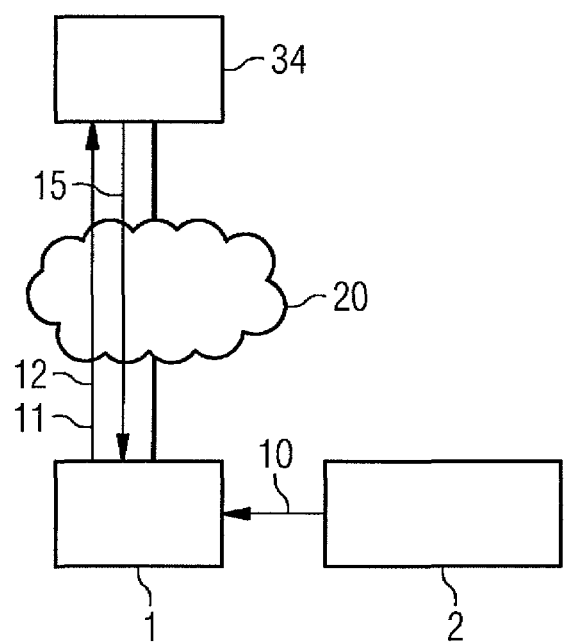
FIG. 2 depicts a monitoring system for a field device having tamper protection according to an embodiment.

FIG. 2 depicts an additional embodiment of a monitoring system for a field device having tamper protection. FIG. 2 shows a monitoring system according to FIG. 1. In contrast to FIG. 1, the registration device 3 and the monitoring device 4 are combined in a control device 34 for the field device 1. If the field device 1 has received a non-tampering assertion from the tamper monitoring device 2, the field device 1 transmits both field device data and the non-tampering assertion via the Internet 20 to the control device 34. The control device 34 initially checks the non-tampering assertion that has been transmitted by the field device 1. If the non-tampering assertion is valid, the transmitted field device data are also accepted by the control device 34.

Figure 3:
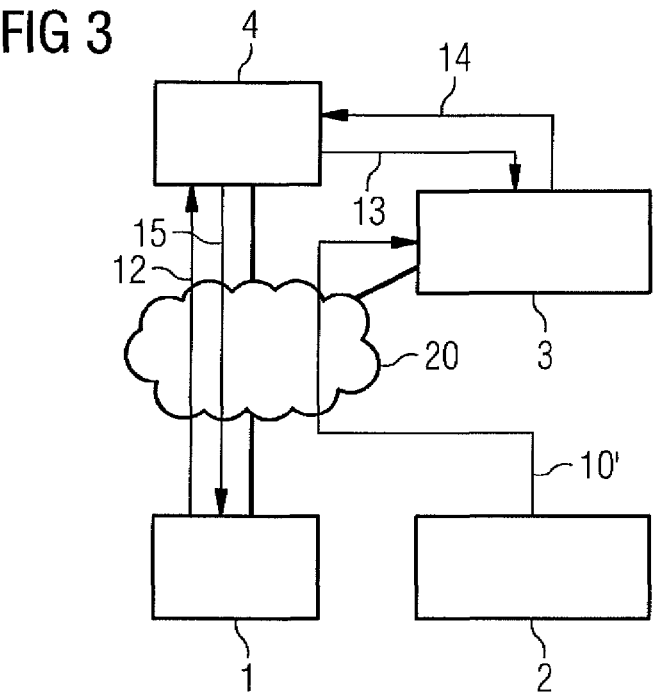
FIG. 3 depicts a monitoring system for a field device having tamper protection according to an embodiment.

FIG. 3 depicts an additional embodiment a monitoring system for a field device having tamper protection. FIG. 3 depicts a monitoring system according to FIG. 1. In distinction from the monitoring system of FIG. 1, the tamper monitoring device 2, if it has detected a physical manipulation at the field device 1, does not transmit the non-tampering assertion to the field device 1 but directly to the registration device 3 via the Internet 20 as shown in FIG. 3. However, it is also possible to transmit the non-tampering assertion via WLAN according to FIGS. 1-5 via a mobile radio network, especially GSM, UMTS, LTE, Wimax, CDMA or the like. The field device does not need to be modified but the tamper monitoring device 2 may communicate with the registration device 3 independently of the field device 1 so that no interface needs to be provided at the field device 1 for communication with the tamper monitoring device 2.

Figure 4A:
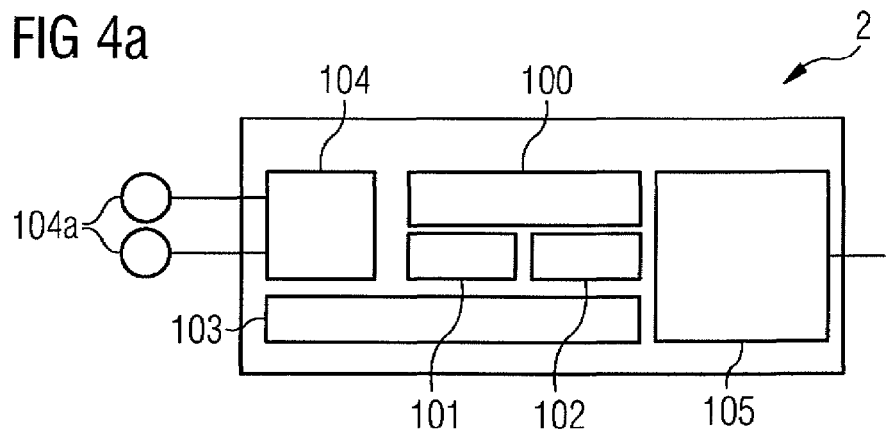
FIGS. 4a and 4b depict tamper monitoring devices according to an embodiment.
Figure 4B:
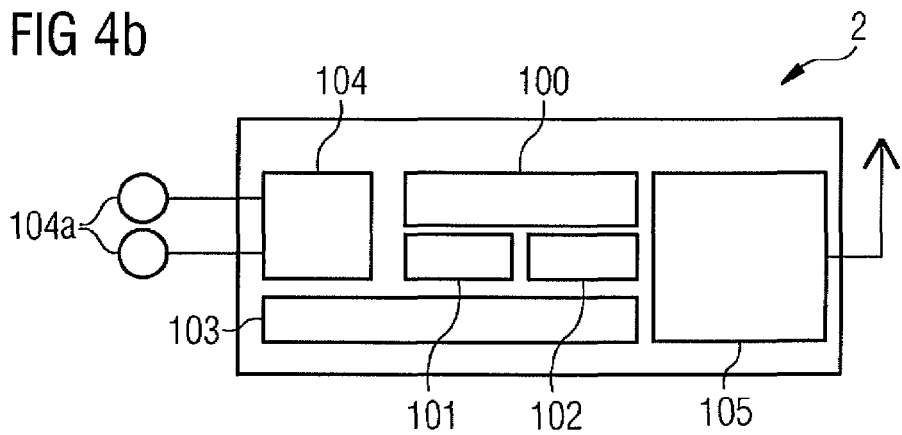

FIGS. 4a, 4b depict embodiments of tamper monitoring devices. In FIGS. 4a and 4b, reference symbol 2 in each case designates a tamper monitoring device. The respective tamper monitoring device 2 may include a control computer 100 connected to a flash memory 101 and a RAM memory 102. The flash memory 101 is used as configuration memory for the tamper monitoring device whilst the RAM memory 102 is used as main memory for the control computer 100. Furthermore, a power supply 103 is arranged in such a manner that, for example, the power supply 103 may be designed to be battery-buffered or as supercap or the power supply may provide energy by energy harvesting in order to be able to use the ambient temperature, the vibrations or air vibrations, for example in the case of power failures, and thus to provide for continuous monitoring of a field device 1. A further advantage is that the tamper monitoring device 2 may be operated reliably even in the absence of an external power supply. The tamper monitoring device 2 includes in each case an input/output device 104, which is connected to sensors 104a for tamper monitoring. In particular, the sensors 104a are arranged outside the housing of the tamper monitoring device 2. Since tamper monitoring device 2 is designed for the special task of tamper monitoring of the field device 1, the tamper monitoring device 2 may be optimized for tamper monitoring in its energy consumption. In this context, the control computer 100 may be in a so-called sleep mode, for example, during the predominant period. If a tamper event is detected by the tamper monitoring device 2, the control computer 100 is activated again.

The tamper monitoring device 2 monitors by the use of the sensors 104a whether tampering is taking place, that is to say a physical manipulation of the field device 1. In this context, the sensors may be designed, for example, as motion sensors, light sensors, contacts, wire netting or similar. As long as no physical manipulation is found by the tamper monitoring device 2, the tamper monitoring device issues a non-tampering assertion. In this context, the non-tampering assertion may be designed, for example, as a data structure that contains an identification number of the tamper monitoring device 2 and time information and/or a counter value. The data structure may be encrypted and provided with a cryptographic checksum, for example in the form of a digital signature or a message authentication code. The cryptographic checksum may be calculated by a cryptographic key stored in the tamper monitoring device 2 and provided by the interface 105. The interface 105 is designed to be wire-connected in FIG. 4a whereas the one in FIG. 4b is designed to be wireless.

In this context, a non-tampering assertion may also contain at least one of the following information items: an identification information item of the tamper monitoring device 2, additional information relating to the field device 1 that is monitored by the tamper monitoring device 2, a status of the field device 1, an information item about a physical manipulation, for example, a note relative to a housing opening of a temperature in the case of too high a temperature difference or the like, furthermore a time information and/or a signature for authentication and securing integrity.

FIG. 5 depicts an embodiment of a method for monitoring a tamper protection of a field device. In FIG. 5, reference symbol 51 designates the act of checking whether there has been a manipulation at the field device 1, reference symbol S2 designates the act of outputting a non-manipulation certificate if a negative test result has been determined, reference symbol S3 designates the act of transmitting the non-manipulation certificate, reference symbol S4 designates the act of checking the non-manipulation certificate by a registration device, reference symbol S5 the act of determining an active status of the field device by the registration device 3 if the non-manipulation certificate is valid, reference symbol S6 designates the act of checking the field device 1 by a monitoring device 4 by transmitting the status of the field device 1, reference symbol S7 designates the act of transmitting the field device data to the monitoring device 4, and reference symbol S8 designates the act of accepting the field device data by the monitoring device 4 as an active status if an active status of the field device 1 is present. Although the present embodiments have been described above by means of preferred exemplary embodiments, it is not restricted to these but can be modified in many ways.

In another embodiment, the tamper monitoring device may be constructed as a separate device that may be arranged at the field device to be monitored or a plurality of field devices to be monitored. In this context, the tamper monitoring device may be constructed as so-called intermediate unit, that is to say mounted between the field device to be monitored and a fixed arrangement, for example a wall, a rail or the like. The tamper monitoring device may be constructed in a separate additional housing, for example for a circuit board. It is also possible to install or to integrate the tamper monitoring device and the sensors possibly present for a tamper monitoring device into the field device to be monitored itself.

In the description and particularly in the claims, a non-manipulation certificate is to be understood to be not only essentially a non-tampering confirmation message or a non-tampering assertion but also a message that specifies that a physical manipulation of the field device monitored has taken place. If a physical manipulation is found, a manipulation certificate may be issued if a positive test result has been determined.

Furthermore, the registration device may be designed in such a manner that the registration device is connected to a certification station. In this context, the certification station can provide the registration device with a certificate revocation list in which a field device certificate of the field device monitored by the tamper monitoring device is listed. As an alternative, the field device certificate may be provided by an online certificate status protocol replier or by an online certificate status protocol responder. This provides for an online transmission of the certificate revocation list.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for monitoring tamper protection of a field device, the method comprising:
   checking whether a manipulation has taken place at the field device;
   outputting a non-manipulation certificate when a negative test result has been determined;
   transmitting the non-manipulation certificate;
   checking the non-manipulation certificate by a registration device;
   determining an active status of the field device by the registration device when the non-manipulation certificate is valid;
   checking the field device by a monitoring device by inquiring about a status of the field device;
   transmitting the field device data to the monitoring device; and
   accepting the field device data by the monitoring device when the field device has the active status.

2. The method as claimed in claim 1, wherein the transmitting of the non-manipulation certificate comprises transmission of the non-manipulation certificate to the registration device by the field device.

3. The method as claimed in claim 2, wherein the transmitting of the non-manipulation certificate occurs at a same time as the transmitting of the field device data.

4. The method as claimed in claim 3, wherein the transmitting of the non-manipulation certificate is carried out by the Internet, by at least one mobile radio network, by at least one satellite network, or by a combination thereof.

5. The method as claimed in claim 1, wherein the transmitting of the non-manipulation certificate occurs at a same time as the transmitting of the field device data.

6. The method as claimed in claim 5, wherein the non-manipulation certificate and the field device data are transmitted to a common control device comprising the registration device and the monitoring device.

7. The method as claimed in claim 1, wherein the transmitting of the non-manipulation certificate is carried out by the Internet, by at least one mobile radio network, by at least one satellite network, or by a combination thereof.

8. The method as claimed in claim 1, wherein the checking whether a manipulation has occurred at the field device, the outputting, and the transmitting the non-manipulation certificate are carried out at predetermined time intervals.

9. A monitoring system for a field device having tamper protection, the monitoring system comprising:
   a tamper monitoring device configured to monitor the field device for tamper protection;
   a registration device configured to register and monitor a status of the field device;
   a monitoring device configured to control and monitor the field device,
   wherein the tamper monitoring device is configured to check whether a manipulation has occurred at the field device and output a non-manipulation certificate when a negative test result has been determined,
   wherein the registration device is configured to check the non-manipulation certificate and determine an active status of the field device in the case of a valid non-manipulation certificate;
   wherein the monitoring device is configured to check the status of the field device, and
   wherein the monitoring device is configured to accept field device data when the field device has the active status.

10. The monitoring system as claimed in claim 9, wherein a control device comprises the registration device and the monitoring device.

11. The monitoring system as claimed in claim 10, wherein the control device is a SCADA control board or an enterprise resource planning system.

12. The monitoring system as claimed in claim 11, wherein at least one of the tamper monitoring device, the registration device, the monitoring device, or the control device comprises a communication interface to the Internet, to a mobile radio network, to a satellite network, or to a combination thereof.

13. The monitoring system as claimed in claim 12, wherein the tamper monitoring device comprises an autonomous power supply.

14. The monitoring system as claimed in claim 11, wherein the tamper monitoring device comprises an autonomous power supply.

15. The monitoring system as claimed in claim 10, wherein at least one of the tamper monitoring device, the registration device, the monitoring device, or the control device comprises a communication interface to the Internet, to a mobile radio network, to a satellite network, or to a combination thereof.

16. The monitoring system as claimed in claim 15, wherein the tamper monitoring device comprises an autonomous power supply.

17. The monitoring system as claimed in claim 9, wherein the tamper monitoring device comprises an autonomous power supply.

18. The monitoring system as claimed in claim 9, wherein the field device is a traffic installation or transformer substation.

* * * * *